United States Patent [19]

Detering et al.

[11] Patent Number: 5,354,945
[45] Date of Patent: Oct. 11, 1994

[54] PREPARATION OF ULTRAPURE N-VINYLPYRROLIDONE POLYMERS

[75] Inventors: Juergen Detering, Limburgerhof; Hartwig Voss, Frankenthal, both of Fed. Rep. of Germany

[73] Assignee: BASF Aktiengesellschaft, Ludwigshafen, Fed. Rep. of Germany

[21] Appl. No.: 982,885

[22] Filed: Nov. 30, 1992

[30] Foreign Application Priority Data

Dec. 5, 1991 [DE] Fed. Rep. of Germany ....... 4140086

[51] Int. Cl.$^5$ .................... C08J 3/07; B01D 61/14
[52] U.S. Cl. .................... 523/310; 528/480; 210/500.21; 210/651; 210/908; 210/500.27; 210/500.38; 210/500.41
[58] Field of Search ............ 523/310; 210/500.21, 210/908, 651; 528/480

[56] References Cited

U.S. PATENT DOCUMENTS

| | | | |
|---|---|---|---|
| 4,636,540 | 1/1987 | Warfel | 523/310 |
| 5,130,025 | 7/1992 | Lefebvre et al. | 210/651 |
| 5,171,767 | 12/1992 | Buckley et al. | 528/482 |

FOREIGN PATENT DOCUMENTS

| | | |
|---|---|---|
| 0000161 | 1/1979 | European Pat. Off. . |
| 0258854 | 3/1988 | European Pat. Off. . |
| 1645642 | 8/1971 | Fed. Rep. of Germany . |
| 3931681 | 4/1991 | Fed. Rep. of Germany . |

OTHER PUBLICATIONS

Hwang et al., "Membranes in Separations," *Techniques of Chemistry* vol. VII, Weissberger, Ed., John Wiley, New York, 1975.
Sigma Chemicals Catalog, p. 1900.
Magnitskii et al., "Possibility of Using Hydrophilic Films . . . ," Tr. Mosk. Khim.-Tekhnol. Inst, 80, 158–161, 1974.
CA104(4): 24020y (Jpn. Kokai Tokkyo Koho JP 60153903, A2 Aug. 13, 1985 Showa, 5 pages).
Jonsson et al., "Separation Characteristics of Ultra Filtration Membranes," *Membranes and Membrane Processes*, Drioli et al., ed., New York, N.Y., Plenum Press, 179–190, 1986.

*Primary Examiner*—Paul R. Michl
*Assistant Examiner*—Andrew E. C. Merriam
*Attorney, Agent, or Firm*—Oblon, Spivak, McClelland, Maier & Neustadt

[57] ABSTRACT

A process for preparing ultrapure polymers (or solutions thereof) which contain at least 20% by weight of N-vinylpyrrolidone as copolymerized units and have a Fikentscher K value of from 10 to 45 by customary free-radical polymerization in solution and subsequent purification of the solution with or without drying comprises purifying the solutions of the polymers by separating off the low molecular weight impurities by means of ultrafiltration at from 20° to 100° C. and from 1 to 80 bar.

6 Claims, No Drawings

PREPARATION OF ULTRAPURE N-VINYLPYRROLIDONE POLYMERS

The present invention concerns a process for preparing ultrapure N-vinylpyrrolidone (VP) polymers by subjecting conventionally prepared polymers in (preferably aqueous or alcoholic) solution to ultrafiltration.

The homo- and copolymers of VP are widely used in particular in the pharmaceutical and cosmetic sector. In pharmacy, they are utilized as assistants for improving the adhesion of tablet coatings and they act as tablet binders, as suspension stabilizers or as solubilizers. In cosmetics they are used as thickeners, dispersants, lubricants and binders and, in hair treatment products, as setting agents and film formers. For toxicological and sensory reasons, the polymers which are used in the pharmaceutical and cosmetic sector should be as free as possible of monomers and other impurities.

VP polymers are prepared by free-radical chain growth polymerization in a solvent (preferably water, alcohols). Unconverted monomers, initiator residues and decomposition products, phlegmatizers mixed in with the initiator, and also low molecular weight products from secondary reactions constitute troublesome impurities here.

Existing methods for the final purification of VP polymers fail to produce a product which meets the increasing purity requirements. The frequently employed method of steam distillation removes only steam-volatile impurities. Distilling off solvent or stripping with nitrogen likewise only removes volatiles (DE-A-3 931 681). It is true that postpolymerization brought about by the subsequent addition of initiators and/or by raising the temperature (EP 161) does reduce the monomer content but it also results in an increase in the concentration of secondary products from the decomposition of the initiator. Moreover, all the processes carried out at elevated temperatures ( >80° C.) may give rise to extremely unwelcome product discolorations. The treatment of aqueous or alcoholic solutions of VP polymers with an adsorbent (activated carbon, zeolite, ion exchangers) has likewise been described only for the removal of VP (EP 258 854). Polar components, for example the eliminated 2-pyrrolidone, are barely removed, if at all. DE-A-1 645 642 describes an extraction process for purifying polyvinylpyrrolidone (PVP) solutions. The extractants used are halogenated hydrocarbons such as carbon tetrachloride or 1,2-dichloroethane, which are claimed to dissolve VP and 2-pyrrolidone preferentially out of the polymer. The disadvantage of this process is that toxically very questionable extractant residues remain in the polymer product, even after drying.

It is an object of the present invention to provide for the isolation of an ultrapure VP polymer a process which avoids the disadvantages mentioned, which does not affect the physico-chemical properties of the polymer and which is directly employable on VP polymer solutions as obtained in industry.

We have found that this object is achieved by the ultrafiltration process claimed in claim 1, which makes it possible to purify the highly concentrated polymer solutions described in a simple and economical manner. In this process, the impure polymer solutions are passed one or more times under pressure through a semipermeable membrane which allows the solvent or solvent mixture and the low molecular weight impurities present therein to pass through but holds back the polymer. The filtrate which has permeated through the membrane (the permeate) can be replaced by fresh solvent or solvent mixture if a buildup in the concentration of the polymer solution to be purified (retentate) is to be avoided (diafiltration). The use of suitable membrane will thus produce any desired diminution in the concentration of the low molecular weight impurities through removal of a corresponding amount of filtrate.

VP polymers for the purposes of the present invention are homo- and copolymers of VP which contain at least 20, preferably at least 30, % by weight of VP as polymerized units. They may have been prepared by any desired method in water and/or organic solvents. The K value according to Fikentscher (Cellulose-Chemie 13 (1932), 58–64, 71–74) should be within the range from 10 to 45, preferably from 15 to 35, measured at 22° C. on a 1% solution in water or ethanol. Suitable organic solvents are for example aliphatic ketones of from 3 to 5 carbon atoms, in particular acetone, also dioxane, tetrahydrofuran or toluene, preferably alcohols of from 1 to 4 carbon atoms, in particular ethanol and isopropanol. It is of course also possible to use mixtures.

Usable comonomers include all the usual ones, for example vinyl esters of carboxylic acids of from 1 to 4 carbon atoms, such as vinyl acetate or propionate; vinyl ethers; acrylic and methacrylic esters of alcohols of from 1 to 8 carbon atoms, such as methyl methacrylate or 2-ethylhexyl acrylate, with or without free hydroxyl groups on the alcohol component, for example hydropropyl acrylate; also acrylic and methacrylic acid; and also vinyllactams, such as vinylcaprolactam. Of course, the copolymerization is not restricted to just one comonomer; on the contrary, two or more comonomers may be included in the copolymerization.

The concentration of the VP polymer solution to be treated has an upper limit, dictated by the viscosity, which in turn depends on the molecular weight. For K values from 10 to 45 the concentration is within the range from 20 to 60%. To reduce the viscosity of the polymer solution, it is advantageous to heat to 100° C., or better to not more than 80° C.

The VP polymer to be purified by means of ultrafiltration can be used directly in the as-polymerized solution.

The purified solution (with the aforementioned solvents) is suitable for commercial purposes in that state. Subsequent spray-drying of the purified solution gives the ultrapure powder. Other drying methods, for example evaporation and grinding of the residue or freeze drying, are likewise possible.

As membranes it is possible to use conventional ultrafiltration membranes, which in general consist of a highly porous layer, for example a woven or nonwoven fabric, supporting the symmetrical or asymmetrical membrane. In addition, the membrane may have at the surface a particularly thin separating layer which optionally contains ionic groups. Customary membrane polymers are for example polysulfones, polyether sulfones, polyamides, polyether ketones, polyureas, polyurethanes, polyvinylidene difluoride, cellulose acetates, cellulose nitrates, polycarbonates and polyepoxides. Depending on the polymer solution to be purified, the membranes used have an exclusion limit of ≦6000 dalton, preferably ≦2000 dalton.

The process of the invention can be carried out not only batchwise but also continuously, in which case the membrane modules are connected in the form of a cascade. The operating temperatures are not more than 100° C., preferably 30°–80° C. the pressures being from 1 to not more than 80 bar, preferably from 5 to 50 bar, and the retentate flow rate is up to 4 m/s, preferably from 0.5 to 3 m/s.

Suitable membrane modules include all commercial types. Preference is given to plate modules, wound modules and tube modules.

The process of the invention makes it possible for the first time ever to prepare ultrapure VP polymers, An additional advantage is that the purification process of the invention does not alter the chemico-physical properties of the VP polymers. In addition, the process is simple and it can be carried out fully continuously and, most importantly, on an industrial scale.

It is surprising, given the feed polymer concentrations of from 20 to 60% and the narrow-pored separating membranes required for an efficient purification process, that the process of the invention works at all, not to say very well, for any length of time. It had to be expected that in the course of the filtration process the membrane would become increasingly covered with a layer of the polymer and that this deposit or gel layer would reduce the flow of permeate and would in particular result in dramatic retention of the low molecular weight impurities to be separated off. It also had to be expected that oligomers would become increasingly embedded in the membrane pores with the consequence of reducing permeate flow through pore blockage and hence additionally reducing the effectiveness of the purifying membrane. Yet, in the process of the invention, the permeate flow remains approximately constant with increasing filtration time. There is no deposition of any polymer to interfere with the separation process. Nor is there any oligomer blockage of the pores, although a small proportion of oligomers does pass through the membrane. Nor is there any adsorptive retention observed in respect of the impurities to be separated off. None of this was in any way foreseeable.

EXAMPLES

The VP polymer solutions are purified batchwise by diafiltration. The retentate is recirculated under pressure through a membrane module. The desired permeate quantity is separated off and replaced by an equal amount of the corresponding solvent (e.g. water or ethanol), which is continuously added to the retentate. As a consequence, the concentration of the polymer feed solution does not change during the purification process. The reduction in the concentration of a low molecular weight impurity is determined under these conditions by its retention and the solvent exchange coefficient (ratio of quantity of permeate to quantity of retentate).

EXAMPLE 1

Purification of a 29% aqueous PVP solution having a K value of 24.5 (measured in a 1% solution in water at 22° C.), prepared by polymerization of VP in water with hydrogen peroxide in the presence of ammonia
Impurities: VP, 2-pyrrolidone, hydrazine, acetaldehyde, ammonium salts
Experimental conditions:
Cell: Flat membrane cell with 100 cm$^2$ membrane area
Membrane: Polysulfone membrane, exclusion limit=2000 dalton
Temperature: 55° C.
Retentate pressure: 10 bar
Permeate flow: 5 kg/m$^2$h
Operating mode: Diafiltration with water

| Result: solvent exchange coefficient | | 2.0 | 3.0 |
|---|---|---|---|
| Diminution in %, based on the starting concentration | VP | 86 | 95 |
| | 2-pyrrolidone | 85 | 93 |
| | hydrazine | 80 | 89 |
| | acetaldehyde | 81 | 90 |
| | ammonium salts | 81 | 88 |

EXAMPLE 2

Purification of a 33% aqueous PVP solution having a K value of 31.7 (measured in a 1% solution in water at 22° C.), prepared by polymerization of VP in water with hydrogen peroxide in the presence of ammonia
Impurities: VP, 2-pyrrolidone, hydrazine, acetaldehyde, ammonium salts
Experimental conditions:
Cell: Plate module with 2 m$^2$ membrane area
Membrane: Polysulfone membrane, exclusion limit=2000 dalton
Temperature: 60° C.
Retentate pressure: 21 bar
Permeate flow: 11 kg/m$^2$h
Operating mode: Diafiltration with water

| Result: solvent exchange coefficient | | 3.2 | 4.2 |
|---|---|---|---|
| Diminution in %, based on the starting concentration | VP | 95 | 98 |
| | 2-pyrrolidone | 90 | 94 |
| | hydrazine | 93 | 97 |
| | acetaldehyde | 90 | 94 |
| | ammonium salts | 88 | 91 |
| | oligomers | 0.3 | — |

EXAMPLE 3

Purification of a 28% aqueous PVP solution having a K value of 26.3 (measured in a 1% solution in water at 22° C.), prepared by polymerization of VP in water with hydrogen peroxide in the presence of ammonia
Impurities: VP, 2-pyrrolidone, hydrazine, acetaldehyde, ammonium salts
Experimental conditions:
Cell: Flat membrane cell with 100 cm$^2$ membrane area
Membrane: Thin-film membrane with separating layer based on polyamide, exclusion limit=1000 dalton
Temperature: 55° C.
Retentate pressure: 20 bar
Permeate flow: 13 kg/m$^2$h
Operating mode: Diafiltration with water

| Result: solvent exchange coefficient | | 3.0 |
|---|---|---|
| Diminution in %, based on the starting concentration | VP | 91 |
| | 2-pyrrolidone | 89 |
| | oligomers | 0.1 |

EXAMPLE 4

Purification of a 27% aqueous PVP solution having a K value of 30.1 (measured in a 1% solution in water at 22° C.), prepared by polymerization of VP in water with hydrogen peroxide in the presence of ammonia
Impurities: VP, 2-pyrrolidone, hydrazine, acetaldehyde, ammonium salts
Experimental conditions:
Cell: Flat membrane cell with 100 cm$^2$ membrane area
Membrane: Thin-film membrane with separating layer based on polyamide, exclusion limit=1000 dalton
Temperature: 55° C.
Retentate pressure: 20 bar
Permeate flow: 13.7 kg/m$^2$h
Operating mode: Diafiltration with water

| Result: solvent exchange coefficient | | 3.1 |
|---|---|---|
| Diminution in %, based on the starting concentration | VP | 95 |
| | 2-pyrrolidone | 92 |
| | oligomers | 0.05 |

EXAMPLE 5

Purification of a 27% aqueous PVP solution having a K value of 30.1 (measured in a 1% solution in water at 22° C.), prepared by polymerization of VP in water with hydrogen peroxide in the presence of ammonia
Impurities: VP, 2-pyrrolidone, hydrazine, acetaldehyde, ammonium salts
Experimental conditions:
Cell: Flat membrane cell with 100 cm$^2$ membrane area
Membrane: Thin-film membrane with separating layer based on polyamide, exclusion limit=2000 dalton
Temperature: 55° C.
Retentate pressure: 20 bar
Permeate flow: 14.3 kg/m$^2$h
Operating mode: Diafiltration with water

| Result: solvent exchange coefficient | | 3.0 |
|---|---|---|
| Diminution in %, based on the starting concentration | VP | 94 |
| | 2-pyrrolidone | 90 |
| | oligomers | 0.08 |

EXAMPLE 6

Purification of a 30% aqueous PVP solution having a K value of 29.2 (measured in a 1% solution in water at 22° C.), prepared by polymerization of VP in water with hydrogen peroxide in the presence of ammonia
Impurities: VP, 2-pyrolidone, hydrazine, acetaldehyde, ammonium salts
Experimental conditions:
Cell: Flat membrane cell with 100 cm$^2$ membrane area
Membrane: Thin-film membrane with separating layer based on polyurea and polyurethane and a support layer made of polyether sulfone, exclusion limit=2000 dalton
Temperature: 55° C.
Retentate pressure: 20 bar
Permeate flow: 13.1 kg/m$^2$h
Operating mode: Diafiltration with water

| Result: solvent exchange coefficient | | 3.0 |
|---|---|---|
| Diminution in %, based on the starting concentration | VP | 94 |
| | 2-pyrrolidone | 88 |

EXAMPLE 7

Purification of a 31% ethanol solution of a copolymer of 30 parts of VP and 70 parts of vinyl acetate having a K value of 33.0 (measured on a 1% solution in ethanol), prepared by polymerization of VP and vinyl acetate in ethanol with t-butyl perpivalate.
Impurities: VP, vinyl acetate, 2-pyrrolidone, pivalic acid
Experimental conditions:
Cell: Flat membrane cell with 100 cm$^2$ membrane area
Membrane: Polysulfone membrane, exclusion limit=2000 dalton
Temperature: 40° C.
Retentate pressure: 20 bar
Permeate flow: 8 kg/m$^2$h
Operating mode: Diafiltration with ethanol

| Result: solvent exchange coefficient | | 3.0 |
|---|---|---|
| Diminution in %, based on the starting concentration | VP | 95 |
| | 2-pyrrolidone | 82 |
| | vinyl acetate | 93 |
| | pivalic acid | 90 |

EXAMPLE 8

Purification of a 47% ethanol solution of a copolymer of 30 parts of VP and 70 parts of vinyl acetate having a K value of 33.0 (measured in a 1% solution in ethanol), prepared by polymerization of VP and vinyl acetate in ethanol with t-butyl perpivalate.
Impurities: VP, vinyl acetate, 2-pyrrolidone, pivalic acid
Experimental conditions:
Cell: Flat membrane cell with 100 cm$^2$ membrane area
Membrane: Thin-film membrane with separating layer based on polyamide, exclusion limit=1000 dalton
Temperature: 55° C.
Retentate pressure: 40 bar
Permeate flow: 3.7 kg/m$^2$h
Operating mode: Diafiltration with ethanol

| Result: solvent exchange coefficient | | 3.5 |
|---|---|---|
| Diminution in %, based on the starting concentration | VP | 97 |
| | 2-pyrrolidone | 94 |
| | vinyl acetate | 96 |
| | pivalic acid | 91 |
| | oligomers | 0.01 |

We claim:
1. A process for preparing ultrapure polymers, or solutions thereof, which contain at least 20% by weight of N-vinylpyrrolidone as polymerized units and have a Fikentscher K value of from 10 to 45 by free-radical polymerization in solution and subsequent purification of the solution with or without drying, which comprises purifying a polymer solution containing said polymer by separating off the low molecular weight impurities by means of ultrafiltration at from 20° to 100° C. and from 1 to 80 bar, wherein the initial concentration of said polymer in said polymer solution is within the range of about 20 to about 60% by weight based on the total weight of the solution.

2. A process as claimed in claim 1, wherein the concentration of the polymer solution in the ultrafiltration is within the range from 30 to 60% by weight.

3. A process as claimed in claim 1, wherein a separating membrane having an exclusion limit of $\leqq 6000$ dalton is used.

4. A process as claimed in claim 2, wherein a separating membrane having an exclusion limit of $\leqq 6000$ dalton is used.

5. A process as claimed in claim 1, wherein a separating membrane having an exclusion limit of $\leqq 2000$ dalton is used.

6. A process as claimed in claim 2, wherein a separating membrane having an exclusion limit of $\leqq 2000$ dalton is used.

* * * * *